United States Patent
Vedantam et al.

(10) Patent No.: US 6,652,231 B2
(45) Date of Patent: Nov. 25, 2003

(54) CLOTH SEAL FOR AN INNER COMPRESSOR DISCHARGE CASE AND METHODS OF LOCATING THE SEAL IN SITU

(75) Inventors: Srikanth Vedantam, Niskayuna, NY (US); Mahmut Faruk Aksit, Istanbul (TK); Ahmad Safi, Troy, NY (US); Abdul-Azeez Mohammed-Fakir, Schenectady, NY (US); Ning Fang, West Chester, OH (US)

(73) Assignee: General Electric Company, Schenectady, NY (US)

( * ) Notice: Subject to any disclaimer, the term of this patent is extended or adjusted under 35 U.S.C. 154(b) by 38 days.

(21) Appl. No.: 10/047,988

(22) Filed: Jan. 17, 2002

(65) Prior Publication Data

US 2003/0133793 A1 Jul. 17, 2003

(51) Int. Cl.⁷ .............................. F01D 11/00
(52) U.S. Cl. .................. 415/214.1; 415/135; 415/138; 415/170.1; 277/637
(58) Field of Search ............... 415/214.1, 138, 415/139, 135, 216–218, 173.7, 174.2, 170.1, 173.6; 277/637, 643, 644, 649, 651, 653, 640, 167.5, 230, 236

(56) References Cited

U.S. PATENT DOCUMENTS

| | | | |
|---|---|---|---|
| 2,217,500 A | * | 10/1940 | Spencer |
| 3,638,716 A | * | 2/1972 | Hart ............................... 165/9 |
| 3,788,767 A | * | 1/1974 | Bednarczyk et al. ........ 415/217 |
| 4,184,689 A | | 1/1980 | Brodell et al. |
| 4,645,217 A | | 2/1987 | Honeycutt, Jr. et al. |
| 4,767,260 A | * | 8/1988 | Clevenger et al. .......... 415/115 |
| 4,815,933 A | | 3/1989 | Hansel et al. |
| 4,863,343 A | | 9/1989 | Smed |
| 5,149,250 A | | 9/1992 | Plemmons et al. |
| 5,154,577 A | * | 10/1992 | Kellock et al. .......... 415/170.1 |
| 5,271,714 A | | 12/1993 | Shepherd et al. |
| 5,372,476 A | | 12/1994 | Hemmelgarn et al. |
| 5,474,306 A | | 12/1995 | Bagepalli et al. |
| 5,509,669 A | | 4/1996 | Wolfe et al. |
| 5,586,773 A | | 12/1996 | Bagepalli et al. |
| 5,657,998 A | | 8/1997 | Dinc et al. |
| 5,915,697 A | | 6/1999 | Bagepalli et al. |
| 5,934,687 A | | 8/1999 | Bagepalli et al. |
| 6,095,750 A | | 8/2000 | Ross et al. |
| 6,162,014 A | | 12/2000 | Bagepalli et al. |
| 6,206,629 B1 | * | 3/2001 | Reluzco et al. ................. 415/1 |
| 6,273,683 B1 | * | 8/2001 | Zagar et al. ............ 416/193 A |

* cited by examiner

Primary Examiner—Edward K. Look
Assistant Examiner—J M. McAleenan
(74) Attorney, Agent, or Firm—Nixon & Vanderhye

(57) ABSTRACT

Upper and lower halves of the inner barrel of a compressor for a turbine are bolted to one another along a horizontal midline joint with metal-to-metal surface contact. Elongated grooves are provided in the engaging surfaces, with the upper groove having a depth greater than the depth of the lower groove. Elongated seals are provided in the grooves, including an elongated shim with a metallic woven covering on opposite sides, and margins having sealing edges. The depth of the seal is equal to or less than the depth of the upper groove and an adherent material maintains the seal in the upper groove during installation. In operation, the adherent material dissolves at temperatures above ambient and the seal drops by gravity to bear against the walls of the grooves in response to high pressure air leaking through any gap at the horizontal midline joint.

17 Claims, 5 Drawing Sheets

CLOTH SEAL FOR AN INNER COMPRESSOR DISCHARGE CASE AND METHODS OF LOCATING THE SEAL IN SITU

BACKGROUND OF THE INVENTION

The present invention relates to a seal between upper and lower halves of an inner compressor discharge case and particularly to a seal between the case halves tolerant of warpage during turbine operation and methods of locating the seal in sealing position in situ.

In a turbine, e.g., a gas turbine, the compressor section includes a stationary inner barrel formed of two semi-cylindrical halves secured one to the other generally along a horizontal midline forming an annulus. The aft end of the inner barrel is secured to a compressor discharge casing which provides support for the nozzle support ring supporting the first-stage nozzle. The inner barrel, in part, segregates a high-pressure region external to the barrel from a lower pressure region within the barrel and about the rotor. The barrel halves at the horizontal midline have metal-to-metal contact surfaces which are machined to high tolerances in efforts to eliminate leakage after assembly and during use. However, warpage during operation of the turbine due to creep can leave a gap of approximately 5 to 7 mils at the bolted horizontal joints between the upper and lower halves of the inner barrel. As a consequence, leakage paths can and do appear between the halves of the inner barrel. A need has therefore arisen to minimize or eliminate any such leakage paths in a manner which is tolerant to warpage during turbine operation.

BRIEF DESCRIPTION OF THE INVENTION

In accordance with a preferred embodiment of the present invention, there is provided a seal for application along the registering and joined horizontal margins of the halves of the inner compressor discharge case, i.e., the inner barrel, in a manner tolerant to warpage of the inner barrel during turbine operation. Particularly, grooves are machined along the mating margins of the upper and lower barrel halves and between the bolts at axially opposite ends of the inner barrel. The grooves in the margins of the upper barrel half are machined to a depth greater than the depth of the grooves formed along the margins of the lower barrel half. An elongated seal is provided in the registering grooves for sealing engagement along surfaces of the grooves in the opposite barrel halves.

Each elongated seal along each joint includes an elongated metal shim overlaid on opposite sides with a woven metallic cloth and secured to the shims, preferably by welding. Opposite elongated edges of the shim project respectively above and below the area of the shim covered by the metallic cloth. Each edge is formed to project radially inwardly of the inner face of the seal and has a reversely formed arcuate flange. With the seal extending lengthwise in the registering grooves, and the turbine in operation, the arcuate flange of the lower edge of the seal bears and seals against the base of the lower groove. The edge of the upper margin of the shim at the juncture of the arcuate flange and the main body of the shim bears and seals against the innermost wall of the upper groove. It will be appreciated that in the event a gap appears at the joint between the upper and lower barrel halves, the higher pressure external to the inner barrel forces the seal radially inwardly, maintaining the sealing engagement of the upper edge of each shim against the innermost side surface of the upper groove.

In order to locate the shim in sealing location within the groove, the distance, i.e., the depth between the upper and lower arcuate flanges of the seal, is short of or less than the distance between the bases of the registering grooves. More particularly, the depth of the seal approximates the depth of the upper groove. During assembly, the seal is maintained in the upper groove by an adherent material. For example, a wax material may be employed to adhere the seal within the upper groove without any portion of the seal projecting beyond the upper groove. When the upper and lower barrel halves are brought together and bolted, the seal is maintained in the upper groove and does not interfere with the sealing faces of the upper and lower halves.

In order to position the seal in its sealing location spanning between the joint and engaging the sealing surfaces of both grooves, the adherent material loses its adherent character at operating temperatures above ambient and at or below turbine operating temperatures. Consequently, at those temperatures, the seal is enabled to drop into the lower groove under the influence of gravity and thus span across the gap between the upper and lower barrel halves. In the event of a leakage gap between the upper and lower halves during operation, the higher pressure external of the barrel urges the seal radially inwardly to engage the sealing surface of the upper groove while the lower flange of the seal engages and seals against the base of the lower groove.

In a preferred embodiment according to the present invention, there is provided an inner compressor discharge case for a gas turbine, comprising a cylindrical barrel formed of upper and lower halves joined to one another at margins thereof along a horizontal midline to form a pair of diametrically spaced joints along opposite sides of the barrel, each of the margins having a groove extending generally parallel to an axis of the cylindrical barrel, the grooves of opposed margins of the halves on respective opposite sides of the barrel lying in registration with one another along the horizontal midline, a seal disposed in each pair of registering grooves, each seal including a shim having a pair of sealing surfaces for sealing against surfaces of the registering grooves, respectively, and a metallic cloth secured along at least one side of the shim and between the sealing surfaces thereof.

In a further preferred embodiment according to the present invention, there is provided an inner compressor discharge case for a gas turbine, comprising a cylindrical barrel formed of upper and lower halves joined to one another at margins thereof along a horizontal midline to form a pair of diametrically spaced joints along opposite sides of the barrel, each of the margins having a groove extending generally parallel to an axis of the cylindrical barrel, the grooves of opposed margins of the halves on respective opposite sides of the barrel lying in registration with one another along the horizontal midline and a seal disposed in each pair of registering grooves, each seal including a metal plate having a pair of sealing surfaces for sealing against surfaces of the registering grooves, respectively, one of the sealing surfaces including an edge of the plate extending out of a plane containing the plate for sealing against a surface of one of the registering grooves, another of the sealing surfaces including another edge of the plate having an arcuate portion for sealing against a surface of another of the registering grooves.

In a further preferred embodiment according to the present invention, there is provided a method of locating a seal along registering faces of first and second mating parts of a gas turbine, comprising the steps of providing a first groove having a first depth in a registering face of the first part, providing a second groove having a second depth in a registering face of the second part, the depth of the first groove being in excess of the depth of the second groove, providing a seal having a depth equal to or less than the depth of the first groove and greater than the depth of the second groove, retaining the seal in the first groove during installation of the seal and releasing the seal from the first groove, enabling the seal to locate in the first and second grooves, spanning the joint between the mating parts.

DETAILED DESCRIPTION OF THE INVENTION

Figure 1:
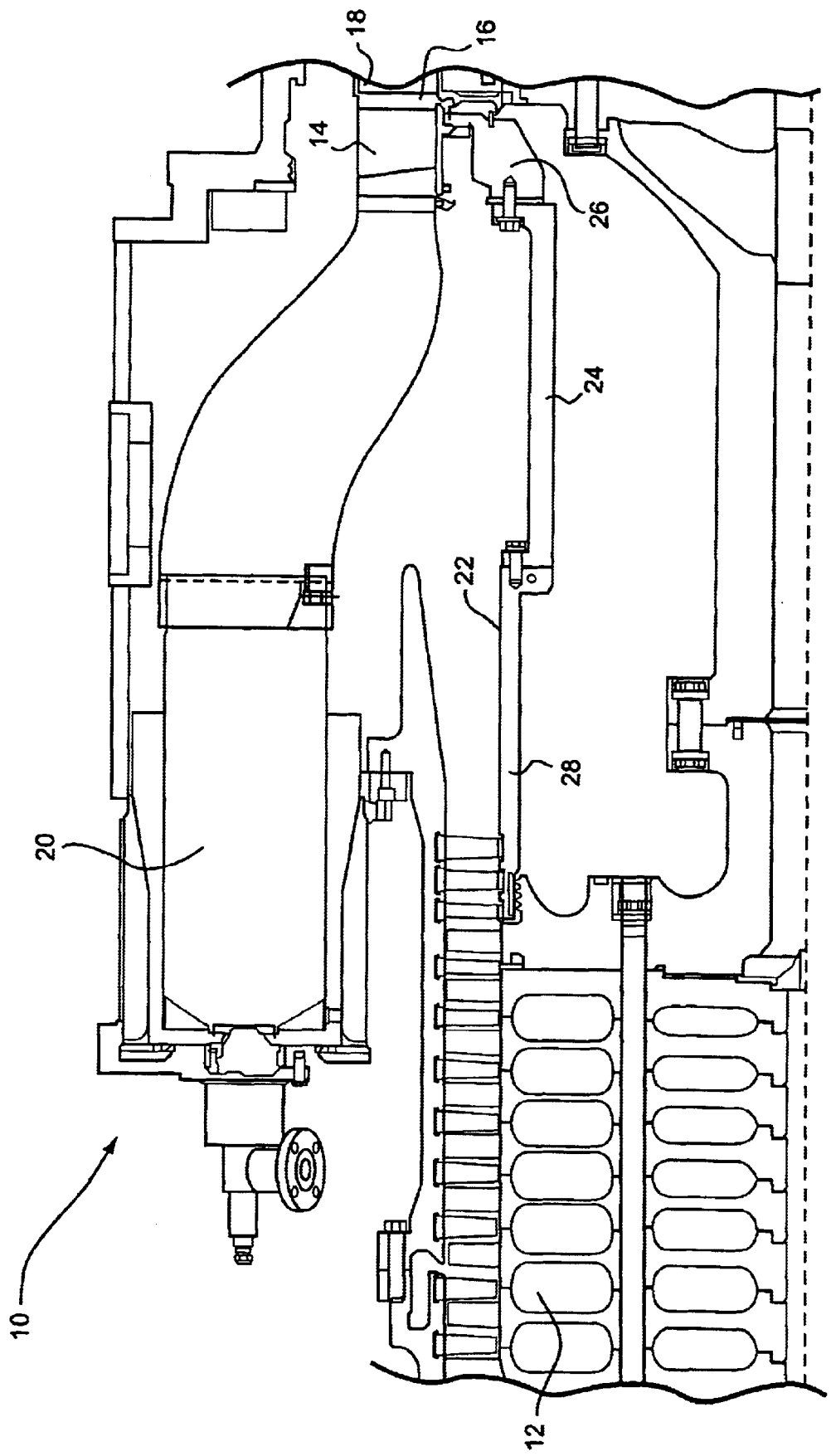
FIG. 1 is a schematic cross-sectional view of an upper half of a portion of a turbine illustrating an inner compressor discharge case.
Figure 2:
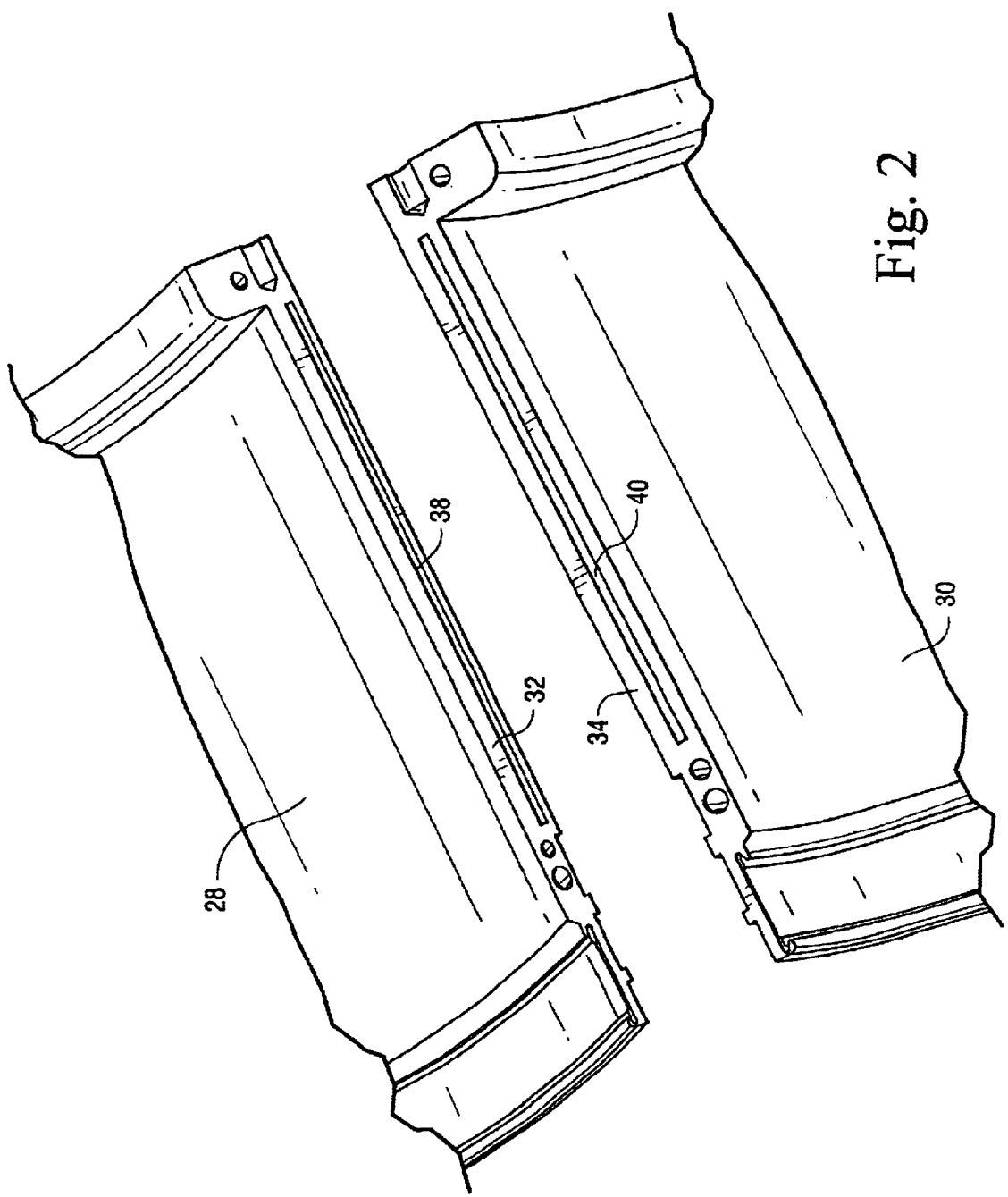
FIG. 2 is a fragmentary perspective view illustrating upper and lower margins of the upper and lower halves of the inner case.

Referring now to the drawings, particularly to FIG. 1, there is illustrated a portion of a gas turbine, generally designated 10, having a compressor section 12, a turbine section 14, including first-stage nozzles 16 and buckets 18, and one of a plurality of combustors 20 spaced circumferentially one from the other about the turbine. It will be appreciated that the compressor 12 provides compressed air for mixing with fuel in each of combustors 20 of the annular array thereof to provide hot gases of combustion from the combustors to the turbine section 14 to drive the turbine rotor. As is conventional, the compressor is provided with an inner compressor discharge case or inner barrel 22 and a compressor discharge casing 24. Casing 24 interconnects the inner barrel 22 and a first-stage nozzle support ring 26. The inner barrel 22 and compressor discharge case 24 are stationary and the inner barrel is conventionally formed of a pair of semi-cylindrical sections, e.g., upper and lower mating halves 28 and 30, respectively (FIG. 2), joined one to the other by bolts along a horizontal midline of the turbine. The barrel halves 28 and 30 are conventionally bolted to one another adjacent opposite ends with their margins or surfaces 32 and 34, respectively, abutting one another. As indicated previously, those margins 32 and 34 are typically machined to a high tolerance in efforts to preclude leakage at the horizontal midline. However, warpage during turbine operation due to creep can provide one or more gaps between the margins 32 and 34 when the halves are bolted to one another, resulting in leakage paths.

In accordance with a preferred embodiment of the present invention, a seal, generally designated 36 (FIG. 3) is provided between the upper and lower halves 28 and 30, respectively, at each of the horizontal midline joints. To provide the seal, a groove is formed in each of the surfaces 32 and 34 at the midline joints and between the end bolts. Thus, in the upper half 28, an elongated groove 38 is formed along each surface 32 and in the lower half 30, an elongated groove 40 is formed along each surface 34. The seal 36 is likewise elongated and is disposed in the registering grooves 38 and 40 to span the joint at the horizontal midline thereby providing a seal at each of the joints along opposite sides of the inner barrel. For reasons discussed below, the upper groove is formed to a depth in excess of the depth of the lower groove 40 and corresponds in depth to the depth D of the seal 36 as illustrated in FIGS. 4 and 5.

Figure 3:
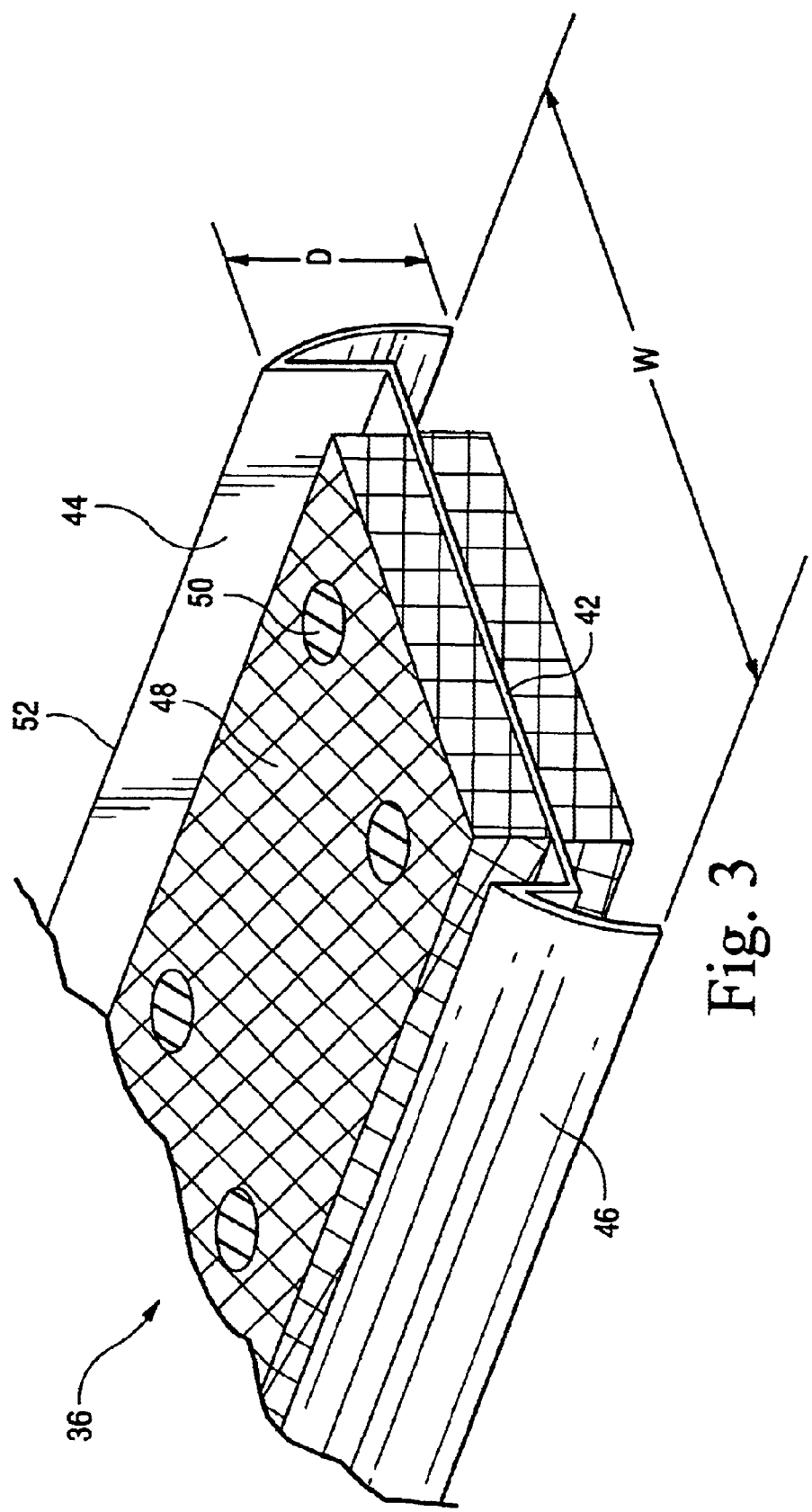
FIG. 3 is a fragmentary perspective view of a seal according to a preferred embodiment of the present invention.

Referring to FIG. 3, the seal 36 includes a metal shim 42 which extends the length and width of the seal 36. The margins of the seal shim 42 along opposite sides are formed, e.g., by bending the shim first toward one side of the seal to form a linear leg or flange 44 and then reversely formed, e.g., bent, to form an arcuate flange 46. As illustrated in FIG. 3, opposite sides of the shim 42 are provided with a covering of a metallic woven cloth 48 secured to the shim 42, preferably by spot-welding, indicated 50 in FIG. 3. The woven metallic cloth, as well as the shim, may be formed of a variety of metal materials such as stainless steel. As also noted below, the juncture of the linear flange 44 and the arcuate flange 46 along the upper margin of seal 36 forms a sealing edge 52 which projects slightly beyond the outer face of the metal cloth 48 on that side of the seal 36. When the seal 36 lies in sealing position as illustrated in FIG. 5, the linear sealing edge 52 bears and seals against a side wall, i.e., the radially inner side wall, of the groove 38. The lower margin of the seal 36, particularly the lower arcuate flange 46, bears and seals against the base of the groove 40. Consequently, any gaps through the mating metal surfaces 32 and 34 of the upper and lower halves 28 and 30, respectively, of the inner barrel are sealed against leakage at operating conditions of the turbine. It will be appreciated that the seal 36 reacts to the greater external pressure outside the barrel in the event of a gap between the upper and lower halves at the midline joint to displace the seal radially inwardly, hence engaging the linear edge 52 against the inner side wall of the upper groove 38. The weight of the seal maintains the lower arcuate flange in sealing relation against the base of the groove.

To locate the seals in situ in sealing positions in the grooves of the inner barrel at the horizontal midline, it is necessary to bolt the upper and lower halves to one another at the metal-to-metal engaging surfaces 32 and 34, with the seals captured by the grooves, positioned to avoid interference with those engaging surfaces 32 and 34 as the halves are bolted to one another, and located for sealing engagement with the barrel halves during turbine operation. To accomplish this, the depth D of the seal 36 and the depth of the upper groove 38 correspond substantially one with the other such that the lower margin of the seal 36 does not extend below the surface 34 when the seal is placed in the groove 38. That is, the depth D of seal 36 is equal to or less than the depth of groove 38. The depth of groove 40, however, is less than the depth D of seal 36.

Figure 4:
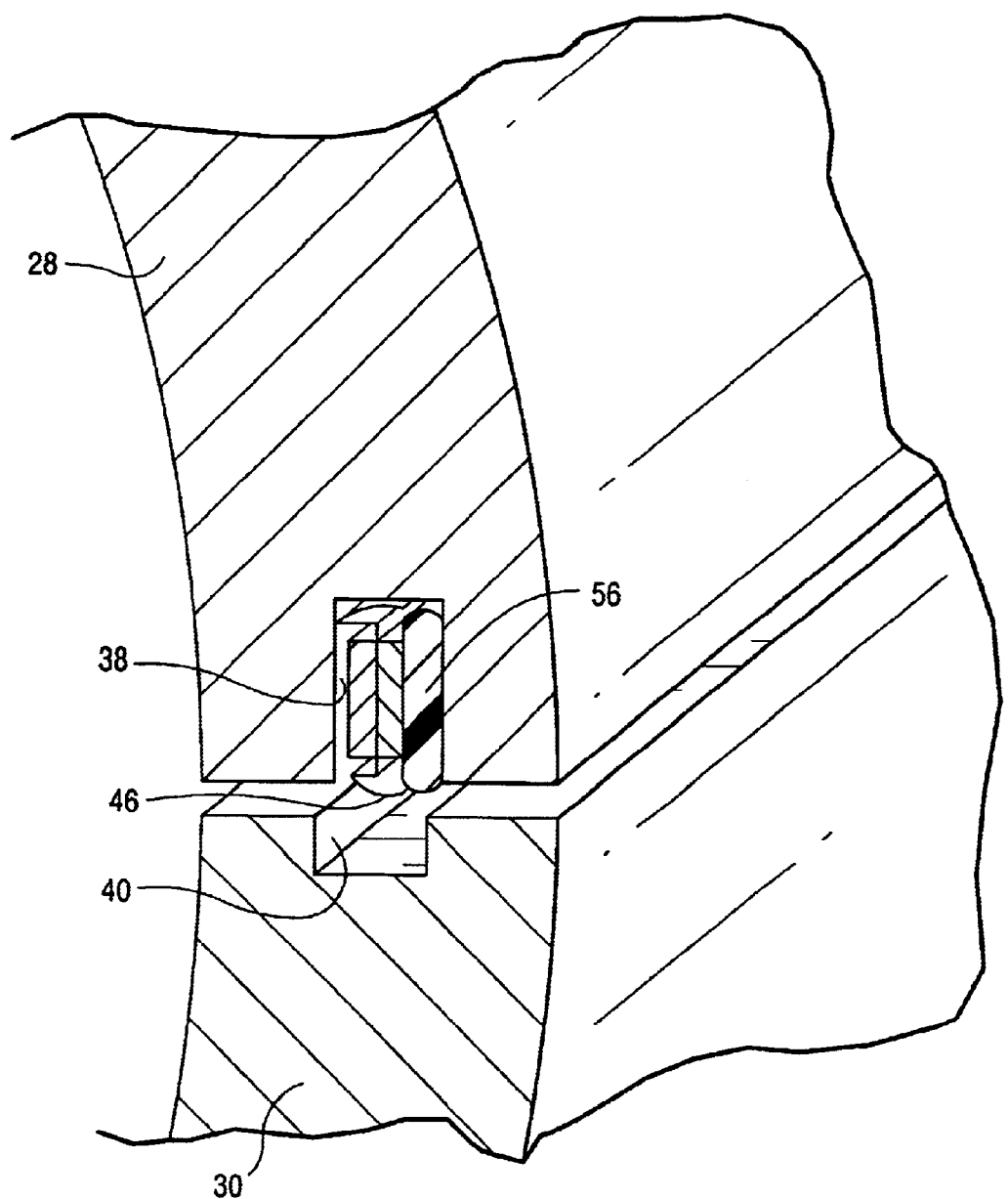
FIG. 4 is a fragmentary perspective view with parts in cross-section illustrating the joint between the upper and lower halves during and after installation of the seal but before turbine operation.
Figure 5:
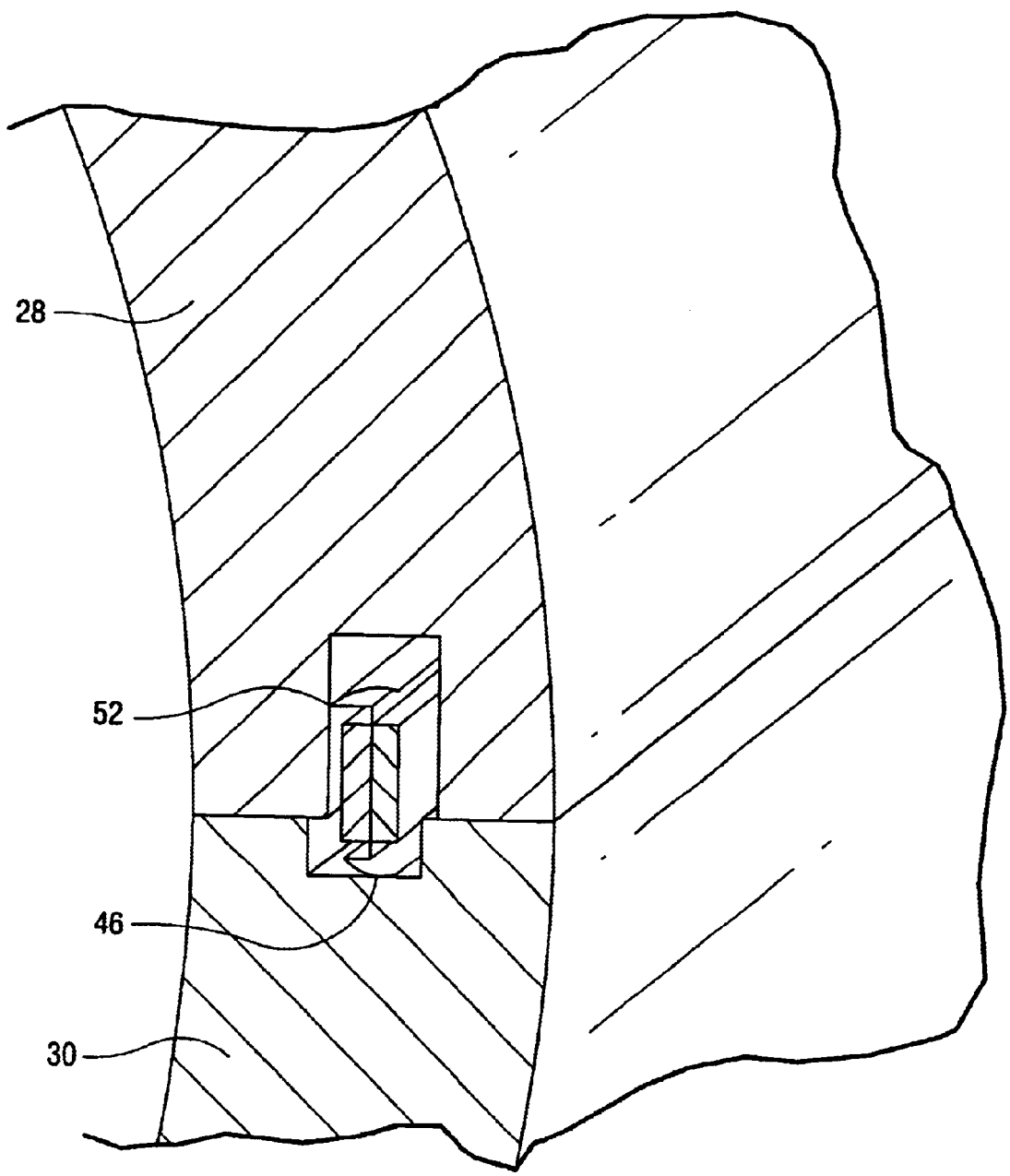
FIG. 5 is a view similar to FIG. 4 illustrating the seal in a sealing condition during turbine operation.

To avoid interference between the seal 36 and the engaging surfaces 32 and 34 of the upper and lower halves as the halves are bolted to one another, the seal 36 is releasably adhered in the groove 38 as illustrated in FIG. 4. As illustrated, the width W of seal 36 is less than the width of the groove 38 whereby the seal would fall from the groove without any such adherence in the groove. To maintain the seal in the upper groove 38 during installation, an adherent material holds the seal in the groove. For example, a wax 56 may be provided in the groove alone one or opposite sides of the seal 36 to adherently maintain the seal in the groove, with the lower margin of the seal flush with or recessed from the surface 32. After the barrel halves bolted together, the seal 36 is maintained in the upper groove 38 by the adherent material until the turbine is operated. At a temperature above ambient and at or below the operating temperature, the adherent material, e.g., the wax, melts, enabling the seal 36 to descend by gravity within the registering grooves into the lower groove 40. Because the depth D of seal 36 is greater than the depth of groove 40, the seal 36 spans the horizontal midline joint between the upper and lower halves. Also, in the event of a gap between the upper and lower halves along the midline, the leakage flow of higher pressure air externally of the inner barrel through the gap displaces the seal generally radially inwardly, causing the linear edge 52 to bear and seal against the inner side surface of groove 38. The lower arcuate flange 46 bears and seals against the base of groove 38. Because the seal is movable within the grooves, the seal is tolerant of any warpage of the barrel which may cause a gap between the barrel halves whereby the seal minimizes or eliminates the leakage caused by any such gaps. It will be appreciated that other types of adherent materials may be used to releasably maintain the seal in the upper groove during installation such as an epoxy meltable at a temperature above ambient and below turbine operating temperature.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An inner compressor discharge case for a gas turbine, comprising:
   a cylindrical barrel formed of upper and lower halves joined to one another at margins thereof along a horizontal midline to form a pair of diametrically spaced joints along opposite sides of the barrel, each of said margins having a groove extending generally parallel to an axis of the cylindrical barrel, the grooves of opposed margins of said halves on respective opposite sides of the barrel lying in registration with one another along the horizontal midline;
   a seal disposed in each pair of registering grooves;
   each said seal including a shim having a pair of sealing surfaces for sealing against surfaces of said registering grooves, respectively; and
   a metallic cloth secured along at least one side of said shim and between said sealing surfaces thereof;
   each said shim including a metal plate having a generally radially inwardly extending leg terminating in one edge thereof for sealing against a surface of one of said registering grooves, said shim being elongated in said registering grooves and lying in a plane generally tangential to the cylindrical barrel, another edge of said shim having an arcuate portion for sealing against a surface of another of said registering grooves.

2. A case according to claim 1 wherein each said seal in said registering grooves has a depth less than the distance between the bases of said registering grooves whereby the seal is at all times spaced from a base of one of said registering grooves.

3. A case according to claim 1 wherein said metallic cloth and said shim are welded to one another.

4. A case according to claim 1 wherein said edges seal respectively against a lateral side of said one groove and a base of said another groove.

5. A case according to claim 1 wherein each of said seals has a radial extent less than the width of the registering grooves whereby each seal is spaced from a side wall of each of the registering grooves.

6. A case according to claim 1 wherein each said seal in said registering grooves has a depth equal to or less than the depth of one of said registering grooves and greater than the depth of another of said registering grooves.

7. A case according to claim 6 including means for retaining said seal in said one registering groove upon installation such that the seal lies wholly within the one registering groove and releasing said seal in said one registering groove for movement in part into said another registering groove to seal between the upper and lower barrel halves along the horizontal midline.

8. A case according to claim 7 wherein said means includes a wax meltable at a temperature above ambient temperature and at or below turbine operating temperatures.

9. An inner compressor discharge case for a gas turbine, comprising:
   a cylindrical barrel formed of upper and lower halves joined to one another at margins thereof along a horizontal midline to form a pair of diametrically spaced joints along opposite sides of the barrel, each of said margins having a groove extending generally parallel to an axis of the cylindrical barrel, the grooves of opposed margins of said halves on respective opposite sides of the barrel lying in registration with one another along the horizontal midline; and
   a seal disposed in each pair of registering grooves;
   each said seal including a metal plate having a pair of sealing surfaces for sealing against surfaces of said registering grooves, respectively, one of said sealing surfaces including an edge of said plate extending out of a plane containing said plate for sealing against a lateral surface of one of said registering grooves, another of said sealing surfaces including another edge of said plate having an arcuate portion for sealing against a base of another of said registering grooves.

10. A case according to claim 9 wherein each said plate is elongated in said registering grooves and lies in a plane generally tangential to the cylindrical barrel, each said plate in said registering grooves having a depth less than the distance between the bases of said registering grooves whereby the seal is at all times spaced from a base of one of said registering grooves.

11. A case according to claim 9 including means for retaining said seal in said one registering groove upon installation whereby the seal lies wholly within the one registering groove and releasing said seal in said one registering groove for movement in part into said another registering groove to seal between the upper and lower barrel halves along the horizontal midline.

12. A case according to claim 11 wherein said means includes a wax meltable at a temperature above ambient temperature and at or below turbine operating temperatures.

13. A method of locating a seal along registering faces of first and second mating parts of a gas turbine having an axis, comprising the steps of:
   providing a first groove extending generally parallel to said axis and having a first depth in a registering face of said first part;
   providing a second groove extending generally parallel to said axis and having a second depth in a registering face of said second part, the depth of said first groove being in excess of the depth of said second groove;

providing a seal having a depth equal to or less than the depth of said first groove and greater than the depth of said second groove;

retaining said seal in said first groove during installation of the seal and releasing the seal from said first groove, enabling the seal to locate in said first and second grooves, spanning the joint between the mating parts.

14. A method according to claim 13 including releasing the seal from said first groove in response to a temperature at the joint in excess of ambient temperature and at or below turbine operating temperatures.

15. A method according to claim 13 including disposing a substance in said first groove to retain said seal therein at ambient temperatures and to release the seal from said first groove in response to a temperature at the joint in excess of ambient temperature or at or below turbine operating temperatures.

16. A method according to claim 15 wherein said substance comprises a wax.

17. A method according to claim 13 wherein said seal includes a metal plate in a plane, the step of providing the seal including forming the plate with an edge extending out of the plane and another edge having an arcuate portion for sealing against a lateral surface of said first groove and against a base of said second groove, respectively.

* * * * *